United States Patent Office 3,415,888
Patented Dec. 10, 1968

3,415,888
POLYSULFIDES AND PROCESS FOR THE
PREPARATION OF SAME
Friedrich K. Lautenschlaeger, Toronto, Ontario, Canada, assignor to The Dunlop Company Limited, London, England, a British company
No Drawing. Filed Mar. 1, 1965, Ser. No. 436,309
Claims priority, application Great Britain, Mar. 14, 1964, 10,887/64; May 1, 1964, 18,119/64
12 Claims. (Cl. 260—608)

ABSTRACT OF THE DISCLOSURE

Chloropolysulphides produced by reacting a hydrocarbon olefin with a sulphur chloride compound having a mole ratio of sulphur to chlorine greater than 1:1. The mole ratio of the sulphur chloride, when based on its average molecular weight, to the hydrocarbon olefin in the reaction mixture is between 1:1 and 1:5. The principal utility for the chloropolysulphides resides in their ability to be reduced to form episulphides which can then be polymerized to yield useful polymers.

---

This invention relates to a process for the preparation of polysulphides, and more particularly to a process for the preparation of chloropolysulphides, and to chloropolysulphides when prepared by the process.

According to the present invention a process for the preparation of a chloropolysulphide comprises reacting a hydrocarbon olefin with a sulphur chloride compound having a mole ratio of sulphur to chlorine of greater than 1:1 to form a chloropolysulphide.

According to the present invention also, there is provided a chloropolysulphide when prepared by the method according to the immediately-preceding paragraph.

The sulphur chloride compound with which the hydrocarbon olefin is reacted has a mole ratio of sulphur to chlorine of greater than 1:1. It is to be understood that the sulphur in the sulphur chloride compound need not necessarily all be combined with the chlorine, for instance a mixture of three moles of free sulphur and one mole of sulphur dichloride is regarded for the purposes of this specification as a sulphur chloride compound having a mole ratio of sulphur to chlorine of 4 to 2 i.e. 2:1. However, the chlorine in the sulphur chloride compound must be combined with at least some of the sulphur.

A suitable sulphur chloride compound having a mole ratio of sulphur to chlorine of greater than 1:1 can be obtained by reacting sulphur monochloride with sulphur, for instance by refluxing a mixture of the two reagents for several days and then removing excess sulphur monochloride. The product is a mixture of sulphur chlorides some of which may have a mole ratio of sulphur to chlorine as high as 25:1. By using such a mixture the yield of the chloropolysulphide obtained can be as high as 100 percent.

The amount of sulphur chloride compound used is usually such that the mole ratio of sulphur chloride compound when based on the average molecular weight (i.e. the weight of the sulphur chloride compound which would completely react with 2 moles of a monoolefin so that all the available chlorine had been removed), to the hydrocarbon monoolefin is from 1:1 to 1:5, preferably from 1:2 to 1:3.5. If desired, the sulphur chloride compound can be added to the hydrocarbon monoolefin in small proportions, or vice-versa.

The method of the present invention can be used for the preparation of chloropolysulphides from hydrocarbon olefins which are liquid at ordinary temperatures, or gaseous at ordinary temperatures, e.g. 25° C. If a gaseous olefin is used the olefin can be dissolved in a solvent therefor such as carbon tetrachloride and the sulphur chloride compound added to the solution, or the gaseous olefin can be add to the sulphur chloride compound which may if desired be used in the form of a solution in carbon tetrachloride. Alternatively, the gaseous olefin can be used in the liquid form and reacted with the sulphur chloride compound in the absence of a solvent for the olefin and in a sealed reaction vessel.

The reaction between the sulphur chloride compound and the hydrocarbon olefin may be carried out in the presence of a catalyst which is cationic in character but although such catalysts increase the rate of reaction, they tend to result in reduced yields of the chloropolysulphide. Examples of catalysts which may be used are zinc chloride, aluminum trichloride, ferric chloride, boron trifluoride which is normally used in the form of an etherate, and phosphorus pentachloride. If a catalyst is used, the reaction is normally carried out at temperatures below room temperature, for example at temperatures between —10° C. and —50° C. Alternatively, the reaction can be carried out in the absence of a catalyst and in this case the temperature employed may be as high as 100° C. However, when ethylene is used as the olefin, the temperature is maintained below 100° C. to avoid the preparation of mustard gas. Temperatures of from 30° C. to 70° C. are preferred when a gaseous olefin is used. The reaction can conveniently be carried out at the boiling point of the olefin, if this is a liquid at ordinary temperatures.

The sulphur chloride compound used to produce the chloropolysulphide is oxidised during the reaction, and if desired, free sulphur or ethyl tetrasulphide may be added to the reaction mixture to regenerate the sulphur chloride compound. The amount of free sulphur or ethyl tetrasulphide added is not critical, and a large excess may be used if desired.

The reaction between the hydrocarbon olefin and the sulphur chloride compound can be effected in the absence of solvent. Alternatively, the reaction can be carried out in an inert solvent such as a hydrocarbon, a chloro-substituted hydrocarbon or an ether. Examples of solvents which can be used are hexane, diethyl ether, carbon tetrachloride, and especially polar solvents such as acetonitrile and nitrobenzene. The amount of solvent used may vary considerably and is usually between 5 mls. and 50 mls. of solvent per mole of the olefin, preferably between 10 mls. and 25 mls. of solvent per mole of the olefin. However, amounts in excess of 50 mls. per mole can be used if desired.

The hydrocarbon olefin which can be used as starting materials can be the acyclic aliphatic mono olefins, diolefins or polyolefins such as ethylene, propylene, butene, isobutene, octene-1, 2-methyl pentene, dodecene, hexadiene and dodecatriene; cyclo-aliphatic monoolefins, diolefins or polyolefins such as cyclohexene, cyclohexadiene, cyclooctadiene, and cyclododecatriene; polycyclic minoolefins, diolefins or polyolefins such as pinene, norbornene, norbornadiene; and aromatic substituted olefins such as allyl benzene. It is to be understood that by the term "hydrocarbon olefin" there is meant an olefin containing carbon atoms and hydrogen atoms only, i.e. an olefin which is free from atoms other than carbon and hydrogen.

The rate of reaction between the sulphur chloride compound and the hydrocarbon olefin, i.e. the rate of addition of the sulphur chloride compound to the olefin, can be increased by adding to the reaction mixture a compound which liberates free radicals such as diphenyl disulphide or butyl dithiocarbamate. Unfortunately, this results in a product containing smaller amounts of the chloropolysulphide.

The product of the reaction between the sulphur chloride compound and the hydrocarbon olefin is a mixture of a chloromonosulphide and a chloropolysulphide. When the hydrocarbon olefin is a hydrocarbon monoolefin, then the chlropolysulphide in the product will be a monomeric dichloropolysulphide in which the chlorine atoms are attached one to each carbon atom beta to the sulphur atoms. When the hydrocarbon olefin is a hydrocarbon diolefin or polyolefin, whether cyclic or acyclic, the chloropolysulphide may be a dichloropolysulphinde or a polymeric form of the dichloropolysulphide. Increased amounts of the polymeric form can be produced by using an amount of the sulphur chloride compound such that the mole ratio of the sulphur chloride compound: diolefin is from 1:1 to 1:2.

It is believed that the chloromonosulphide in the reaction product is produced by a side reaction involving radicals generated during the reaction between the hydrocarbon olefin and the sulphur chloride compound and that an increase in the amount of the chloropolysulphide produced can be obtained by adding hydroquinone to the reaction mixture.

The chloropolysulphides prepared by the process of the present invention can be reduced to form monomeric episulphide compounds. The reduction may suitably be achieved using a non-acidic reduction system, e.g. aluminum amalgam and water.

When the chloropolysulphides prepared according to the process of the present invention are to be reduced to prepare episulphides, then there is no necessity to isolate and purify the chloropolysulphide, since the other constituents of the reaction product are not reducible to episulphides, and can easily be separated from the episulphides obtained.

When the monomeric chloropolysulphides of the present invention are reduced, the product is a monomeric monoepisulphide, but the polymeric form of the chloropolysulphide is reduced the product is a monomeric di-episulphide or polyepisulphide. However, as stated hereinbefore, when a diolefin or a polyolefin is reacted with the sulphur chloride compound the product will probably contain a monomeric chloropolysulphide and a polymeric form of the chloropolysulphide. In this case, the reduction product will contain both the monoepisulphide and the di- or polyepisulphide. The episulphides can be separated and purified by distillation under reduced pressures. The chloromonosulphides produced in addition to the chloropolysulphides are not reducible to episulphides.

In other circumstances, however, it may be necessary to isolate the chloropolysulphide, and this may be effected by column elution chromatography using a hydrocarbon solvent or carbon disulphide as the eluant. The chloropolysulphide passes through the column first, and further purification can be effected by thin-layer chromatography. Alternatively, chloropolysulphides of olefins of low boiling point, e.g. propylene, can be extracted by gas chromatography in which case only the chloropolysulphide is retained within the column.

The invention is illustrated by the following examples:

EXAMPLE I

This example illustrates the preparation of chloropolysulphides from hydrocarbon monoolefins.

To a clean, dry three-necked flask fitted with a thermometer, a condenser fitted with a drying tube (calcium chloride), a dropping funnel and a stirrer was added 336 gms. (4 moles) of 2-methyl-1-pentene. The 2-methyl-1-pentene was stirred and 377 gms. of a sulphur chloride compound were added in small portions over a period of ten hours. The sulphur chloride compound had an average molecular weight of 220 (i.e. 220 gms. of this compound would completely react with 2 moles of a hydrocarbon monoolefin until all available chlorine had been removed), and was obtained by refluxing a mixture of sulphur monochloride and free sulphur for several days and subsequently removing any unreacted sulphur monochloride by distillation. The mixture was cooled throughout by external cooling to maintain the temperature below 30° C. The reaction was allowed to proceed until all the sulphur chloride compound had reacted (as shown by a negative test with potassium iodide), and then any remaining 2-methyl-1-pentene and any other volatile compounds were removed by evaporation under reduced pressure to yield 553 gms. of bis(beta-chloro-beta-methylpentyl)-1-pentyl polysulphide.

The above procedure was repeated eleven times (Experiments Nos. 2 to 12), but using the combinations of hydrocarbon monoolefins and sulphur chloride compounds given in Table I below in which the amounts of each ingredient are also given. In Table I "SxCly" represents the average molecular weight of the sulphur chloride compound.

TABLE I

| Expt. No. | Olefin | Amt. (gms.) | SxCly | Amt. (gms.) of SxCly |
|---|---|---|---|---|
| 1 | 2-methyl-1-pentene | 336 | 220 | 377 |
| 2 | 4-methyl pentene-2 | 119 | 162 | 83.3 |
| 3 | Decene-1 | 59 | 210 | 40 |
| 4 | Nonene-1 | 68.2 | 264 | 54.7 |
| 5 | Dodecene-1 | 90 | 264 | 66 |
| 6 | Pinene | 170 | 210 | 127 |
| 7 | Norbornene* | 73 | 218 | 81 |
| 8 | Cyclopentene | 160 | 164 | 198 |
| 9 | Cyclohexene | 30 | 282 | 10 |
| 10 | Cyclo-octene | 95.4 | 166 | 75 |
| 11 | 1-methyl cyclohexene | 96 | 164 | 82 |
| 12 | Allyl benzene* | 129.9 | 210 | 105 |

*In experiments Nos. 7 and 12 the reaction was effected in the presence of 150 mls. of pentane and 150 mls. of hexane respectively.

In Experiments Nos. 2, 4 and 7 to 10, the sulphur chloride compound was added in a single portion; in Experiments Nos. 3, 6, 11 and 12 the sulphur chloride compound was added in small portions over a period of 1 hour, 32 hours, 3 hours and 10 hours respectively; and in Experiment No. 5 one third of the sulphur chloride compound was added initially and the remainder was added after 3 days.

The reaction conditions and the yields of chloropolysulphide are specified in Table II below, in which "Time" represents the time required to complete the reaction after the final addition of the sulphur chloride compound.

TABLE II

| Expt. No. | Initial Temp. (° C.) | Max. Temp. (° C.) | Time | Yield (gms.) |
|---|---|---|---|---|
| 1 | 25 | Below 30 | | 553 |
| 2 | 25 | do | 4 days | 167 |
| 3 | | do | 64 hours | 82.7 |
| 4 | 40 | Below 50 | 7 days | |
| 5 | 25 | Below 40 | 3 days | 150 |
| 6 | 0 | Below 10 | 30 mins | 288 |
| 7 | −40 | *−30 | 3 hours* | 143 |
| 8 | 25 | Below 40 | | 359 |
| 9 | 25 | Below 35 | 10 hours | 15.8 |
| 10 | 20 | Below 30 | | 171 |
| 11 | 25 | Below 45 | | 167 |
| 12 | 25 | Below 40 | 4 days | 200 |

*2 hours at −30° C. followed by 1 hour at 10° C.

The products obtained in Experiments Nos. 3, 4, 5, 8, 9 and 12 were analysed by infra-red spectroscopy and the following absorbances were observed, where s=strong, m=medium, w=weak and sh=shoulder.

EXPERIMENT NO. 3 (DECENE-1)

| | | | | |
|---|---|---|---|---|
| 2890 (s) | 2840 (s) | 1460 (s) | 1439 (m, sh) | 1415 (w, sh) |
| 1377 (m) | 1298 (m) | 1284 (m) | 1263 (w) | 1235 (w) |
| 1212 (w) | 1160 (w) | 1120 (w) | 990 (w) | 717 (s) |

EXPERIMENT 4 (NONENE-1)

| | | | | |
|---|---|---|---|---|
| 2900 (s) | 2835 (s) | 1470 (m, sh) | 1460 (m) | 1437 (m) | 1377 (m) |
| 1288 (m) | 1270 (w) | 1230 (w) | 1202 (w) | 1160 (w) | 1118 (w) |
| 990 (w) | 907 (w) | 717 (s) | | | |

EXPERIMENT 5 (DODECENE-1)

| | | | | |
|---|---|---|---|---|
| 2900 (s) | 2835 (s) | 1468 (m, sh) | 1463 (m) | 1437 (m) |
| 1377 (m) | 1300 (w, sh) | 1288 (w) | 1265 (w) | 907 (v.w) |
| 717 (s) | | | | |

EXPERIMENT B (CYCLOPENTENE)

| | | | | | |
|---|---|---|---|---|---|
| 2935 (s) | 2860 (s) | 1463 (s) | 1439 (s) | 1313 (s) | 1277 (m) |
| 1248 (m) | 1213 (m) | 1192 (s) | 1132 (w) | 1046 (m) | 1028 (w, sh) |
| 910 (m, sh) | 893 (m) | 880 (m, sh) | 785 (m) | 670 (s) | |

EXPERIMENT 9 (CYCLOHEXENE)

| | | | | | |
|---|---|---|---|---|---|
| 1452 (s) | 1445 (m, sh) | 1360 (w) | 1343 (m) | 1322 (w, sh) | 1298 (w, sh) |
| 1280 (m) | 1270 (m) | 1260 (m) | 1233 (w) | 1218 (m, sh) | 1200 (m) |
| 1188 (m) | 1137 (m) | 1122 (w) | 1110 (w) | 1078 (w) | 1052 (w) |
| 1042 (w) | 1005 (m) | 984 (m) | 909 (m) | 875 (m, sh) | 867 (m) |
| 846 (m) | 828 (m) | 815 (m) | 740 (s) | 710 (w) | 693 (s) |

EXPERIMENT 12 (ALLYL BENZENE)

| | | | | |
|---|---|---|---|---|
| 1610 (m) | 1588 (m, sh) | 1498 (s) | 1455 (s) | 1434 (s) |
| 1298 (m) | 1276 (m) | 1232 (w) | 1177 (m) | 1157 (m) |
| 1075 (w) | 1030 (m) | 1003 (w) | 990 (w) | 907 (s) |
| 860 (w) | 840 (w) | 823 (w) | 802 (w) | 747 (s) |
| 722 (w) | 698 (s) | | | |

EXAMPLE II

This example illustrates the preparation of chloropolysulphides from hydrocarbon diolefins.

The procedure outlined in Example I was repeated nine times but using the combinations of hydrocarbon diolefins and sulphur chloride compounds specified in Table III below:

TABLE III

| Expt. No. | Olefin | Amt. (gms.) | SxCly | Amt. SxCly (gms.) |
|---|---|---|---|---|
| 1 | Hexadiene-1,5 | 58 | | 87 |
| 2 | do | 74 | 210 | 178.5 |
| 3 | Pentadiene-1,4 | 82 | 210 | 227 |
| 4 | Octadiene-1,7 | 165 | 218 | 315 |
| 5 | Vinyl cyclohexene-4 | 108 | 218 | 218 |
| 6 | Cyclohexadiene-1,4 | 80 | 220 | 186 |
| 7 | Norbornadiene | 186 | | 238 |
| 8 | Cyclo-octadiene-1,5 | 648 (+108) | 218 | 654 |
| 9 | Exo-dicyclopentadiene | 13.2 | 272 | 26.5 |

The reaction conditions are given in Table IV, in which "Addition Period" shows the period of time over which the sulphur chloride compound was added, and "Time" shows the time required to complete the reaction after the final addition.

TABLE IV

| Expt. No. | Addition Period, hours | Initial Temp. (° C.) | Max. Temp. (° C.) | Time |
|---|---|---|---|---|
| 1 | | 25 | Reflux temp | 2 hours. |
| 2 | 24 | 25 | Below 45 | 1 hour. |
| 3 | 48 | | Below 25 | 64 hours. |
| 4 | 12 | 25 | Below 40 | |
| 5 | 3 | 25 | do | |
| 6 | (1) | −10 | Below 30 | 1½ hours. |
| 7 | (1) | (2) | 30 | |
| 8 | (1) | | Below 25 | |
| 9 | (1) | −20 | 40 | 8 hours. |

[1] In Experiment No. 6, 5 gms. of the sulphur chloride compound were added initially and after this had reacted (negative test with potassium iodide) a further 181 gms. were added with cooling and stirring.
[2] Below 0.

In Experiment No. 7 the norbornadiene was added to the sulphur chloride compound in an initial amount of 100 gms. at a temperature of below 0° C., followed by the addition of 50 gms. at a temperature of from 0° C. to 20° C. and finally the addition of 36 gms. at a temperature of from 20° C. to 30° C.

In Experiment No. 8, 10 gms. of the sulphur chloride compound were added initially to 648 the diolefin and then 644 gms. were added in 10 ml. portions at intervals of time. After 500 gms. of the sulphur chloride compound had been added, 108 gms. of the diolefin were added to assist stirring of the mixture.

In Experiment No. 9, 13.25 gms. of the sulphur chloride compound were added to the olefin at a temperature of −20° C. and the mixture was allowed to warm to 0° C. A further 13.25 gms. of the olefin were then added and the temperature was allowed to rise to 40° C. 10 mls. of tetrahydrofurane were added to improve stirring.

In each of Experiments 2 to 9 a chloropolysulphide was obtained. This product was not isolated but was reduced to the corresponding episulphide using aluminium amalgam and water as the reducing means.

The chloropolysulphides from Experiments 2 and 6 to 9 were analysed by infra-red spectroscopy. The following absorbances were noted:

EXPERIMENT NO. 2 (HEXADIENE 1,5)

| | | | | |
|---|---|---|---|---|
| 2910 (s) | 2840 (s) | 1645 (w) | 1438 (s) | 1408 (m, sh) |
| 1363 (w) | 1333 (w, sh) | 1304 (m) | 1282 (m) | 1258 (m) |
| 1210 (w) | 1172 (w) | 1025 (m) | 992 (m) | 968 (w) |
| 946 (w) | 912 (m) | 830 (m) | 795 (w) | 784 (w) |
| 745 (m) | 715 (s) | | | |

EXPERIMENT NO. 6 (CYCLOHEXADIENE 1,4)

| | | | | |
|---|---|---|---|---|
| 1665 (w) | 1518 (s) | 1468 (w) | 1440 (w) | 1336 (w) |
| 1332 (m, sh) | 1279 (m) | 1263 (w) | 1246 (w) | 1210 (m) |
| 1162 (w) | 1127 (w) | 987 (m) | 968 (m) | 938 (m) |
| 898 (m) | 858 (m) | 838 (m) | 743 (s) | 690 (s) |

EXPERIMENT NO. 7 (NORBORNADIENE)

| | | | | |
|---|---|---|---|---|
| 3040 (m) | 2940 (s) | 2850 (s) | 1633 (w) | 1573 (w) |
| 1450 (s) | 1340 (w, sh) | 1330 (s) | 1295 (s) | 1280 (s, sh) |
| 1257 (s) | 1232 (s) | 1210 (s) | 1151 (w) | 1127 (w) |
| 1107 (w) | 1090 (m) | 1060 (w, sh) | 1047 (m) | 1013 (w) |
| 1002 (w) | 986 (m) | 965 (s) | 940 (s, sh) | 930 (s) |
| 916 (s) | 899 (s) | 886 (s) | 873 (m) | 857 (w) |
| 815 (s) | 794 (s) | 766 (s) | 743 (s) | 707 (s) |
| 686 (s) | | | | |

EXPERIMENT NO. 8 (CYCLO-OCTADIENE-1,5)

| | | | | |
|---|---|---|---|---|
| 3010 (s) | 2940 (m, sh) | 1483 (m) | 1468 (m, sh) | 1443 (m, sh) |
| 1433 (m) | 1352 (w) | 1335 (w) | 1275 (w) | 1264 (w) |
| 1235 (m) | 1198 (w) | 1175 (w) | 1155 (m) | 1088 (w) |
| 1067 (m) | 1009 (w) | 993 (m) | 980 (w) | 967 (w) |
| 945 (m) | 911 (m) | 888 (m) | 857 (m) | 817 (s) |
| 778 (w) | 755 (m) | 735 (s) | 705 (w, sh) | 685 (s) |

EXPERIMENT NO. 9 (EXO-DICYCLOPENTADIENE)

| | | | | |
|---|---|---|---|---|
| 2945 (s) | 2840 (m) | 1309 (m, sh) | 1297 (s) | 1276 (w, sh) |
| 1264 (m) | 1243 (m) | 1223 (m) | 1200 (m) | 1003 (w) |
| 975 (w) | 955 (w) | 945 (w) | 922 (m, sh) | 906 (s) |
| 891 (m, sh) | 817 (m) | 785 (m) | 741 (m) | 673 (w) |

EXAMPLE III

This example describes the preparation of bis(beta-chloroethyl) polysulphide.

262 gms. of a sulphur chloride compound having an average molecular weight of 262 were placed in a stainless steel bomb having a lining of pyrex and ethylene at a pressure of 300 pounds per square inch was introduced and was maintained at this pressure for 2 days at 15° C. After this time, the reaction product was dissolved in 500 mls. of acetone and the solution was refluxed for 1 hour. The free sulphur was removed by filtration, and the acetone was removed by evaporation to yield 125 gms. of a product which was identified as bis(beta-chloroethyl) polysulphide. This product was reducible to produce ethylene episulphide.

EXAMPLE IV

This example describes the preparation of bis(beta-chloropropyl) polysulphide from propylene.

13 gms. of a sulphur chloride compound having an average molecular weight of 282 were placed in a pyrex high-pressure tube and 15 gms. of propylene were then condensed into the tube at the temperature of liquid nitrogen. The tube was sealed under vacuum and then the reaction mixture was allowed to warm to room temperature. After 7 days a colourless solution had formed. The tube was cooled to the temperature of liquid nitrogen and was then opened. The excess propylene was allowed to evaporate to yield 16.1 gms. of a product which after distillation gave a product having a boiling point of 40–75° C. at a pressure of 0.5 mms. of mercury.

This product was analysed by gas chromatography and was found to contain 58.5 percent by weight of bis(beta-chloropropyl) polysulphide and 41.5 percent by weight of bis(beta-chloropropyl) monosulphide.

EXAMPLE V

This example illustrates the effect of increasing the mole ratio of sulphur to chlorine in the sulphur chloride compound on the yield of bis(beta-chloropropyl) polysulphide prepared from propylene.

Into a pyrex high-pressure tube at the temperature of liquid nitrogen were placed equimolar proportions of propylene and a sulphur chloride compound having an average molecular weight of 135. The tube was sealed under vacuum and the reactants were allowed to rise in temperature to approximately 25° C. After 7 days, the tube was opened at the temperature of liquid nitrogen and then the excess propylene was removed by evaporation.

The above procedure was repeated twice (Experiments 2 and 3) and the Experiment No. 2 was repeated twice (Experiments 4 and 5) but in each experiment an additive was used as shown in Table V below. The reaction conditions are given in Table V, in which "Mol. wt." represents the average molecular weight of the sulphur chloride compound, THF represents tetrahydrofurane, and Hq represents hydroquinone. In Experiments 4 and 5 the amount of the solvent used was such that the resulting solution contained approximately 50 percent by weight of the reactants.

TABLE V

| Expt. No. | Mol wt. | Additive | Total yield, percent | Yield of chloro-polysulphide (percent) |
|---|---|---|---|---|
| 1 | 135 |  | 97 | 65 |
| 2 | 210 |  | 93 | 80 |
| 3 | 282 |  | 95 | 92 |
| 4 | 210 | THF, Hq. | 97 | 75 |
| 5 | 210 | CCl$_4$ |  | 87 |

The products were all yellow liquids which showed no tendency for the elimination of hydrogen chloride.

These results show that as the average molecular weight of the sulphur chloride compound increases, the total yield of chlorosulphides remains substantially unchanged but the yield of the dichloropolysulphide increases.

EXAMPLE VI

This example describes the preparation of bis(beta-chlorocyclohexene polysulphide from cyclohexene and illustrates the types of catalysts and solvents which may be used.

Cyclohexene (2 moles) was reacted with a sulphur chloride compound (1 mole) having an average molecular weight of 282 by the procedure outlined in Example I except that a catalyst and/or a solvent were added to the reaction mixture as shown in Table VI below, in which DPD represents diphenyl disulphide.

TABLE VI

| Expt. No. | Catalyst | Solvent | Temp. (° C.) | Yield of polysulphide (percent) |
|---|---|---|---|---|
| 1 | Butyl S |  | 25 | 81 |
| 2 | Al$_2$Cl$_6$(1 g.) |  | 83 | 78 |
| 3 | ZnCl$_2$(2 g.) | Ether (25 mls.) | −10 | 76 |
| 4 | FeCl$_3$(1 g.) | CCl$_4$(50 mls.) | −15 | 78 |
| 5 | DPD |  | 25 | 75 |
| 6 | ZnCl$_2$(2 g.) | Ether (50 mls.) CCl$_4$ (20 mls.) | 20 | 73 |
| 7 |  | Et. Acetate (25 mls.) | 25 | 69 |
| 8 |  | Acrylonitrile (25 mls.) | 30 | 79 |

These results show that the reaction is negligibly affected by a change in the solvent and/or the catalyst.

Having now described my invention, what I claim is:

1. As a composition of matter, a bis(beta-chloro-organo)polysulphide reaction product of a hydrocarbon olefin with a sulphur chloride compound having a mole ratio of sulphur to chlorine substantially greater than 1:1.

2. The composition of matter of claim 1 wherein the sulphur chloride compound has a mole ratio of sulphur to chlorine of between about 3:2 and about 25:1.

3. A process for the preparation of a bis(beta-chloro-organo)polysulphide which comprises reacting a hydrocarbon olefin with a sulphur chloride compound having a mole ratio of sulphur to chloride of substantially greater than 1:1 to form a bis(beta-chloro-organo)polysulphide.

4. A process according to claim 3 in which the amount of the sulphur chloride compound used is such that the mole ratio of the sulphur chloride compound when based on its average molecular weight to the hydrocarbon olefin is from 1:1 to 1:5.

5. A process according to claim 3 in which hydrocarbon olefin is reacted with the sulphur chloride compound at a temperature of from −50° C. to 100° C.

6. A process according to claim 3 in which the sulphur chloride compound is added to the hydrocarbon olefin gradually.

7. A process according to claim 3 in which the sulphur chloride compound is a mixture of sulphur mono-chloride and free sulphur.

8. A process according to claim 3 in which an accelerator is added to the reaction between the sulphur chloride compound and the hydrocarbon olefin, said accelerator being selected from the group consisting of diphenyl disulphide and butyl dithiocarbamate.

9. A process according to claim 3 in which a catalyst is added to accelerate the reaction between the sulphur chloride compound and the hydrocarbon olefin, said catalyst being selected from the group consisting of aluminium trichloride, zinc dichloride, ferric trichloride, boron trifluoride and phosphorus pentachloride.

10. A process according to claim 9 in which the amount of the catalyst is from 0.3 gramme to 2 grammes of the catalyst per mole of the hydrocarbon olefin.

11. A process according to claim 3 in which the reaction is effected in the presence of a solvent for the hydrocarbon olefin which is inert to the ingredients of the reaction mixture.

12. A process according to claim 11 in which the amount of the solvent is from 5 mls. to 50 mls. of solvent per mole of the hydrocarbon olefin.

References Cited

UNITED STATES PATENTS 2,249,312  7/1941  Kimball _____ 260—139
3,109,032  10/1963  Aichenegg _____ 260—608

OTHER REFERENCES

Mellor, Comprehensive Treatise on Inorganic and Theoretical Chemistry, vol. 10, pp. 631, 632, 635, 639, 646.

CHARLES B. PARKER, *Primary Examiner.*

JOSEPH P. BRUST, *Examiner.*

D. R. PHILLIPS, *Assistant Examiner.*

U.S. Cl. X.R.

260—79, 327